_(12)_ United States Patent
Sahyoun et al.

(10) Patent No.: US 9,140,310 B2
(45) Date of Patent: Sep. 22, 2015

(54) DISC CARRIER OF A FRICTION CLUTCH

(75) Inventors: Ahmed Sahyoun, Weilheim (DE); Falk Nickel, Fuchstal (DE); Georg Ruprecht, Biessenhoffen (DE)

(73) Assignee: HOERBIGER ANTRIEBSTECHNIK GMBH, Schongau (DE)

( * ) Notice: Subject to any disclaimer, the term of this patent is extended or adjusted under 35 U.S.C. 154(b) by 941 days.

(21) Appl. No.: 11/881,817

(22) Filed: Jul. 27, 2007

(65) Prior Publication Data

US 2008/0067023 A1    Mar. 20, 2008

(30) Foreign Application Priority Data

Jul. 28, 2006    (EP) ..................................... 06015824

(51) Int. Cl.
*F16D 13/68*    (2006.01)
*F16F 15/123*    (2006.01)

(52) U.S. Cl.
CPC ............. *F16D 13/683* (2013.01); *F16F 15/123* (2013.01); *Y10T 74/213* (2015.01)

(58) Field of Classification Search
CPC .................................................... F16D 13/683
USPC ........... 192/70.19, 70.2, 70.17, 112; 188/71.5
See application file for complete search history.

(56) References Cited

U.S. PATENT DOCUMENTS

| | | | | |
|---|---|---|---|---|
| 1,851,700 A * | 3/1932 | Gibbs ......................... | 192/70.12 |
| 2,036,005 A * | 3/1936 | Wemp ......................... | 192/70.21 |
| 2,080,395 A * | 5/1937 | Begg et al. ................ | 188/218 R |
| 2,857,992 A | 10/1958 | Rappaport | |
| 3,191,735 A * | 6/1965 | Wavak ....................... | 192/110 R |
| 3,291,272 A * | 12/1966 | Fawick ....................... | 192/84.91 |
| 4,440,282 A * | 4/1984 | Ishimaru et al. ............. | 192/70.2 |
| 4,846,326 A | 7/1989 | Tilton et al. | |
| 5,284,232 A * | 2/1994 | Prud'Homme ............ | 192/70.21 |
| 5,996,757 A | 12/1999 | Hofmann et al. | |
| 6,035,986 A * | 3/2000 | Hofmann et al. .......... | 192/70.12 |
| 6,142,276 A | 11/2000 | Pinschmidt et al. | |
| 6,409,002 B1 * | 6/2002 | Orlamunder et al. ...... | 192/70.17 |
| 6,523,662 B1 | 2/2003 | Orlamunder | |
| 6,915,886 B2 * | 7/2005 | Dacho et al. ................. | 192/3.29 |
| 7,416,067 B2 * | 8/2008 | Heinrich et al. ............. | 192/70.2 |
| 2002/0108833 A1 | 8/2002 | Bonser | |
| 2006/0006039 A1 * | 1/2006 | Hoebel et al. .............. | 192/70.11 |
| 2007/0193850 A1 * | 8/2007 | Sturgin et al. ................. | 192/212 |
| 2008/0257678 A1 * | 10/2008 | Ari ................................ | 192/112 |

FOREIGN PATENT DOCUMENTS

| | | |
|---|---|---|
| DE | 19827339 | 12/1999 |
| DE | 19928513 | 12/2000 |
| JP | 56-071534 | 11/1954 |
| JP | 05-092543 | 12/1993 |
| JP | 07-259886 | 10/1995 |
| JP | 08049728 | 2/1996 |
| JP | 2006-105397 | 4/2006 |
| RU | 2143619 | 12/1999 |

\* cited by examiner

*Primary Examiner* — Terry Chau
(74) *Attorney, Agent, or Firm* — Tarolli, Sundheim, Covell & Tummino LLP

(57) ABSTRACT

A disc carrier of a friction clutch is described and illustrated, and in some embodiments has a subassembly of a modular structure which is composed of interconnectable component parts. The component parts can include a holding ring, at least one web, and a base plate.

11 Claims, 1 Drawing Sheet

DISC CARRIER OF A FRICTION CLUTCH

CROSS-REFERENCE TO RELATED APPLICATIONS

Priority is hereby claimed to European Patent Application No. 06015824.3 filed on Jul. 28, 2006, the entire contents of which are incorporated herein by reference.

FIELD OF THE INVENTION

The present invention relates to friction clutches, and to friction clutch disc carriers.

BACKGROUND

The ongoing diversification of model ranges of car makers on the worldwide car market has spurred the movement toward increasingly smaller numbers of pieces for individual models. In addition, trends continue toward shorter life cycles of models due to regular model revisions. As a result, frequent design changes for subassemblies in the drive trains of vehicles (e.g., cars and/or motorcycles) are common, because increasingly greater torques must be transmitted, or weights must be reduced.

In the case of friction clutches in drive trains of vehicles, the casings of conventional prior art clutch systems are, for example, produced by steel shaping processes, by casting processes, or by light metal die-casting processes. These processes typically require cost- and time-intensive tooling. When vehicle models are revised, high tooling costs arise in the event of design changes (e.g. smaller or larger clutch diameters, or smaller or larger overall assembly lengths).

SUMMARY

Some embodiments of the present invention provide a disc carrier of a friction clutch which permits a flexible design that simultaneously provides low tooling costs and ensures fast availability, while being competitive with respect to known disc carriers with regard to component part prices.

In some embodiments, a disc carrier of a modular structure is created in the form of a subassembly of usable components that can be assembled in a flexible manner. The components can be mounted in different combinations to obtain disc carriers that are usable in many ways. The components can be produced for prototypes and in small quantities by way of suitable methods (e.g., laser cutting) in relatively fast manners and at relatively low costs. Where greater numbers of pieces are desired, correspondingly advantageous production methods can be adopted, such as by punching, without any change in design. By virtue of the multiple-use components for mounting the disc carrier, low production costs can be achieved.

Some embodiments of the present invention further provide the possibility of integrating additional functions, such as torsional dampers in clutches for motorcycles. Production costs and component sizes can be reduced due to the absence of separate components, assuming this function is employed in the design. Some constructions according to the present invention can permit the use of materials that allow an increased surface pressure of the discs. The thickness of the discs can thereby be reduced, thereby conserving assembly space.

The design concept of the friction clutch according to some embodiments of the present invention is ideal for use in motorcycles, automobiles, and in any other type of vehicle (e.g., tractors, agricultural machines, and construction machines). Furthermore, it is possible according to the present invention to provide both dry and wet multi-disc clutches.

In summary, one or more of the following advantages can be achieved according to some embodiments of the present invention over known solutions:
high flexibility in the design of disc carrier variations;
reduction of overall clutch axial space requirements;
low tooling costs for disc carrier production;
cost savings through multiple uses of clutch components in the same or different clutches;
lower production costs by parts reduction;
low clutch weight in comparison to known clutches;
low mass moment of inertia in comparison to known clutches;
increased bursting speed;
faster prototype availability due to manufacturing processes with small tooling efforts;
improved cooling and lubricating of friction surfaces through more free space for oil flow; and
lower drag moment due to improved oil outflow.

BRIEF DESCRIPTION OF THE DRAWINGS

Further details, advantages, and features of the present invention will become apparent from the following description of embodiments with reference to the drawings, in which.

DETAILED DESCRIPTION

Figure 1:
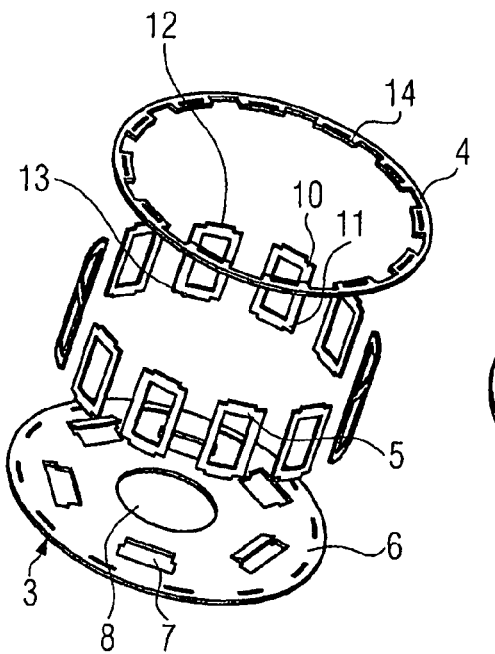
FIG. 1 is an exploded perspective view of a disc carrier subassembly according to an embodiment of the present invention.
Figure 2:
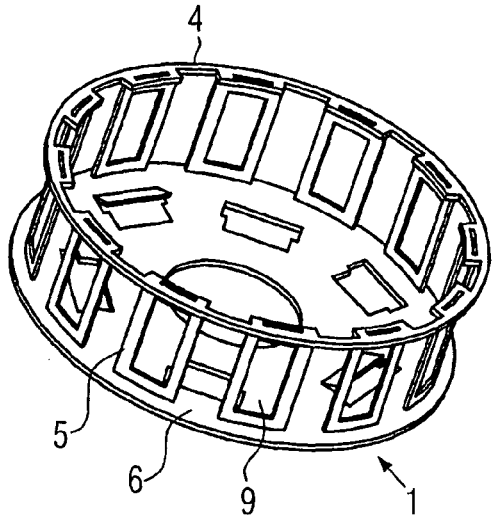
FIG. 2 is an assembled perspective view of the disc carrier shown in FIG. 2.

The construction of a disc carrier 1 according to an embodiment of the present invention, and the construction of a modular subassembly 3 of the disc carrier 1, is illustrated in FIGS. 1 and 2. With reference first to FIG. 1, the subassembly 3 includes a circular holding ring 4 and a base plate 6 in the illustrated embodiment. As shown in FIG. 1, a plurality of webs 5 are arranged between the holding ring 4 and the base plate 6. In the illustrated embodiment, all of the webs 5 are of the same construction (two of the webs being indicated by reference numeral 5). Also in the illustrated embodiment, twelve webs 5 are used, each constructed in the form of a generally rectangular frame with a rectangular central recess 9, as shown in detail in FIG. 1.

Each web 5 has narrow sides 10 and 11. Tabs 12 and 13 are located at the narrow sides 10 and 11 of the respective webs 5. The webs 5 and tabs 12 and 13 form a planar flat member in the illustrated embodiment. The tabs 12 and 13 serve to fasten the webs 5 to the holding ring 4 and to the base plate 6, respectively.

The holding ring 4 is shown in FIGS. 1 and 2 by way of example, and comprises a plurality of inwardly-oriented lugs 14. As shown in FIG. 1, the holding ring 4 in the illustrated embodiment comprises twelve lugs 14, the number of lugs corresponding to the number of webs 5 fastened to the lugs 14.

Finally, FIG. 1 illustrates, by way of example, the circular construction of the base plate 6, which is provided with a central circular aperture 8. Six illustrated rectangular apertures 7 are disposed between the circular aperture 8 and the outer circumference of the base plate 6, and are distributed by way of example at equal angular distances. The rectangular recesses 7 are provided for receiving springs of a torsional damper, which shall be explained in more detail below with reference to FIG. 3.

FIG. 2 illustrates the structure of the disc carrier 1 according to an embodiment of the present invention, and shows the subassembly 3. As described above, the carrier 1 comprises twelve webs 5 in the illustrated embodiment. However, it is also possible to provide a different number of webs 5, depending on the individual application.

The component parts 4, 5, 6 of the subassembly 3 can be joined to provide the necessary stiffness and strength of the disc carrier 1 (e.g., by shaping processes, thermal joining processes, adhesive connections, or pressed connections).

Figure 3:
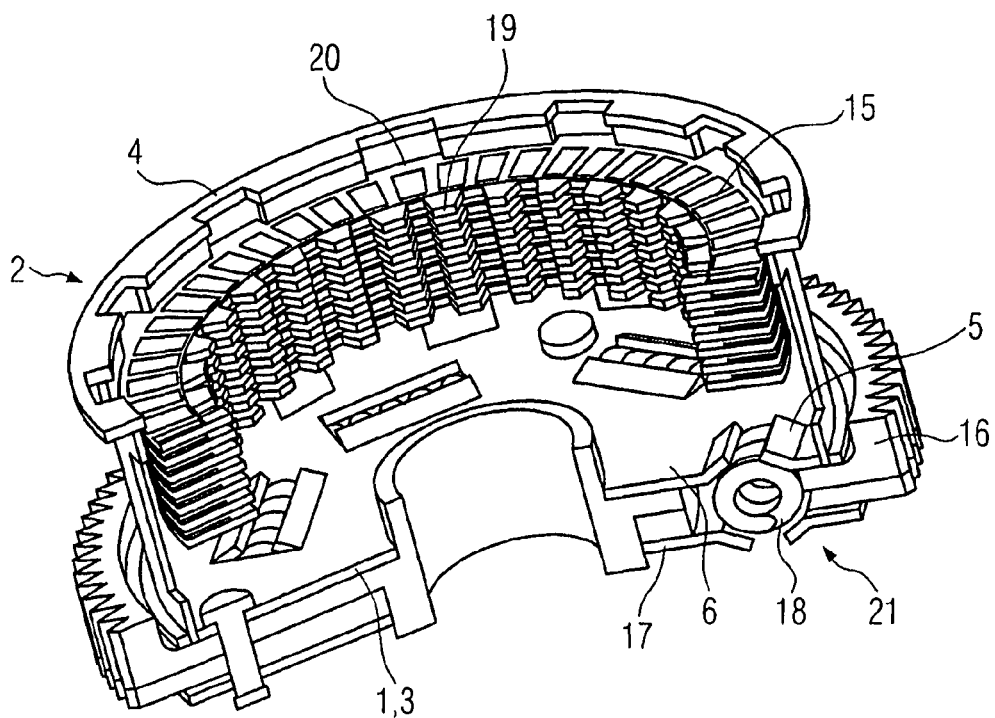
FIG. 3 is a perspective, partial section view of a friction clutch according to an embodiment of the present invention.

FIG. 3 illustrates a friction clutch 2 according to an embodiment of the present invention, which can be used, for example, in cars and/or motorcycles.

The friction clutch 2 in the illustrated embodiment is provided with a torsional damper 21, which comprises a plurality of springs 18.

Furthermore, FIG. 3 shows an arrangement of friction discs 15 and complementary discs 19 in the disc carrier 1, and a lining carrier indicated by reference numeral 20.

In the assembled state of the friction clutch 2 shown in FIG. 3, the base plate 6 can additionally serve as a counter bearing 17 for the springs 18 of the integrated torsional damper 21.

Furthermore, with an appropriate selection of material for the base plate 6, no special anti-wear measures are needed between springs 18 and base plate 6, as is required in typical conventional clutches (e.g., such as in motorcycles).

This is also true for the contact region between the base plate 6 and a primary wheel 16, which is also shown in FIG. 3. Typically, conventional clutches must, as is generally known, include an additional anti-wear component.

With a suitable selection of material for the webs 5, increased surface pressures are possible between the webs 5 and the friction discs 15. In comparison with clutches in motorcycles, for example, the carrier friction lining material of the friction discs 15 of the present invention can be made much thinner, and axial installation space can be saved to a considerable degree.

As a supplement to this written disclosure, explicit reference is hereby made to the drawings according to FIGS. 1 to 3.

What is claimed is:

1. A disc carrier of a friction clutch, comprising:
a subassembly having a modular structure comprising a plurality of interconnectable component parts, said interconnectable component parts comprising a holding ring having a closed ring shape, a plurality of discrete webs, and a base plate,
said holding ring comprising a plurality of radially inwardly oriented lugs, wherein said webs are fastened to said holding ring at said radially inwardly oriented lugs.

2. The disc carrier of claim 1, further comprising a plurality of apertures defined in said base plate.

3. The disc carrier of claim 1, wherein said webs have a rectangular frame with a central aperture.

4. The disc carrier of claim 1, wherein tabs are provided at narrow sides of said webs, each web forming a planar flat member.

5. The disc carrier according to claim 1, wherein said component parts are joined by at least one of shaping processes, press connections, adhesive connections, and thermal joining.

6. The disc carrier of claim 1, wherein said holding ring is a planar flat member.

7. A friction clutch for vehicles, comprising:
a torsional damper; and
a disc carrier comprising a modular subassembly having
a holding ring having a closed ring shape;
a plurality of discrete webs
a base plate; and
a plurality of friction discs,
said holding ring comprising a plurality of radially inwardly oriented lugs, wherein said webs are fastened to said holding ring at said radially inwardly oriented lugs and said friction discs having radially outwardly extending protrusions extending between adjacent webs.

8. The friction clutch of claim 7, further comprising a plurality of apertures defined in said base plate.

9. The friction clutch of claim 7, wherein said webs are substantially rectangular, and have a central aperture.

10. The friction clutch of claim 7, wherein tabs are provided at narrow sides of said webs, each web forming a planar flat member.

11. The disc carrier of claim 7, wherein said holding ring is a planar flat member.

* * * * *